(12) United States Patent
 Kaushik et al.

(10) Patent No.:     US 12,628,108 B2
(45) Date of Patent:         May 12, 2026

(54) AVOIDING REDUNDANT VOICE CAPABILITY UPDATES FROM THE AMF TO THE UDM

(71) Applicant: T-Mobile USA, Inc., Bellevue, WA (US)

(72) Inventors: Subramania Kaushik, Bellevue, WA (US); Anil Kumar Mariyani, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 203 days.

(21) Appl. No.: 18/229,160

(22) Filed: Aug. 1, 2023

(65) Prior Publication Data

US 2025/0048302 A1     Feb. 6, 2025

(51) Int. Cl.
    *H04W 60/04*          (2009.01)
    *H04W 36/00*          (2009.01)
(52) U.S. Cl.
    CPC ..... *H04W 60/04* (2013.01); *H04W 36/00226* (2023.05)
(58) Field of Classification Search
    CPC ........................ H04W 36/00226; H04W 60/04
    See application file for complete search history.

(56) References Cited

U.S. PATENT DOCUMENTS 11,818,578 B2 * 11/2023 Li ......................... H04W 12/65
2019/0007500 A1     1/2019 Kim et al.

| | | | |
|---|---|---|---|
| 2019/0053295 A1 * | 2/2019 | Castellanos Zamora | .................... H04W 60/00 |
| 2019/0174449 A1 | 6/2019 | Shan et al. | |
| 2019/0199802 A1 * | 6/2019 | Zhu | ....................... H04W 76/19 |
| 2019/0230556 A1 | 7/2019 | Lee | |
| 2020/0084675 A1 * | 3/2020 | Lu | ......................... H04W 80/10 |
| 2021/0029603 A1 | 1/2021 | Kim et al. | |
| 2021/0105847 A1 * | 4/2021 | Prabhakar | ............. H04W 36/26 |
| 2021/0385625 A1 | 12/2021 | Qiao et al. | |
| 2022/0167244 A1 | 5/2022 | Zaus et al. | |
| 2022/0201638 A1 | 6/2022 | Arrobo Vidal et al. | |
| 2022/0338099 A1 | 10/2022 | Zhu et al. | |
| 2022/0386399 A1 * | 12/2022 | Huang | .................. H04W 4/029 |
| 2022/0394566 A1 | 12/2022 | Liu et al. | |
| 2022/0408395 A1 | 12/2022 | Li et al. | |

(Continued)

OTHER PUBLICATIONS

3GPP; TSG SA, "Procedures for the 5G Systems (5GS); Stage 2 (Release 18)", 3GPP TS 23.502, vol. 18.2.0, Jun. 29, 2023.

(Continued)

*Primary Examiner* — Raymond S Dean
(74) *Attorney, Agent, or Firm* — Lee & Hayes, P.C.

(57)          ABSTRACT

An access and mobility management function (AMF) configured to send a registration message with an initial registration flag set to false to a unified data management node (UDM) and refrain from sending an update message to the UDM is described herein. The AMF receives a registration request from a user equipment (UE) associated with a handover of the UE from a fourth generation (4G) network to a fifth generation (5G) network and determines that the registration request is not for an initial registration. In response to determining that the registration request is not for an initial registration, the AMF sends the registration message to the UDM with an initial registration flag set to false and refrains from sending the update message to the UDM.

20 Claims, 4 Drawing Sheets

(56)                    References Cited

U.S. PATENT DOCUMENTS

| | | | |
|---|---|---|---|
| 2022/0408397 A1 * | 12/2022 | Zhu ...................... | H04W 60/06 |
| 2023/0189194 A1 | 6/2023 | Ayers et al. | |
| 2024/0121588 A1 | 4/2024 | Tian et al. | |
| 2024/0205863 A1 | 6/2024 | Nassar et al. | |
| 2025/0048075 A1 | 2/2025 | Kaushik | |
| 2025/0056333 A1 | 2/2025 | Kaushik | |

OTHER PUBLICATIONS

Nokia, et al., "AMF to indicate the capability of supporting non-3GPP access path switching", C1-232484, 3GPP TSG-CT WG1, Meeting #141-e, Apr. 10, 2023, pp. 1-63.

Nokia, et al., "Network indication to the UE for discontinuous coverage of satellite access support", C1-232149, 3GPP TSG-CT WG1, Meeting #141-e, Apr. 10, 2023, pp. 1-62.

Sharp, et al., "Capability negotiation for Discontinuous Coverage Supported", C1-232326, 3GPP TSG-CT WG1, Meeting #141-e, Apr. 10, 2023, pp. 1-90.

Search Report and Written Opinion for International Application No. PCT/US2024/040399, Dated Nov. 13, 2024, 8 pages.

Search Report and Written Opinion for International Application No. PCT/US2024/040409, Dated Nov. 13, 2024, 9 pages.

Search Report and Written Opinion for International Application No. PCT/US24/40422, Dated Nov. 5, 2024, 9 pages.

* cited by examiner

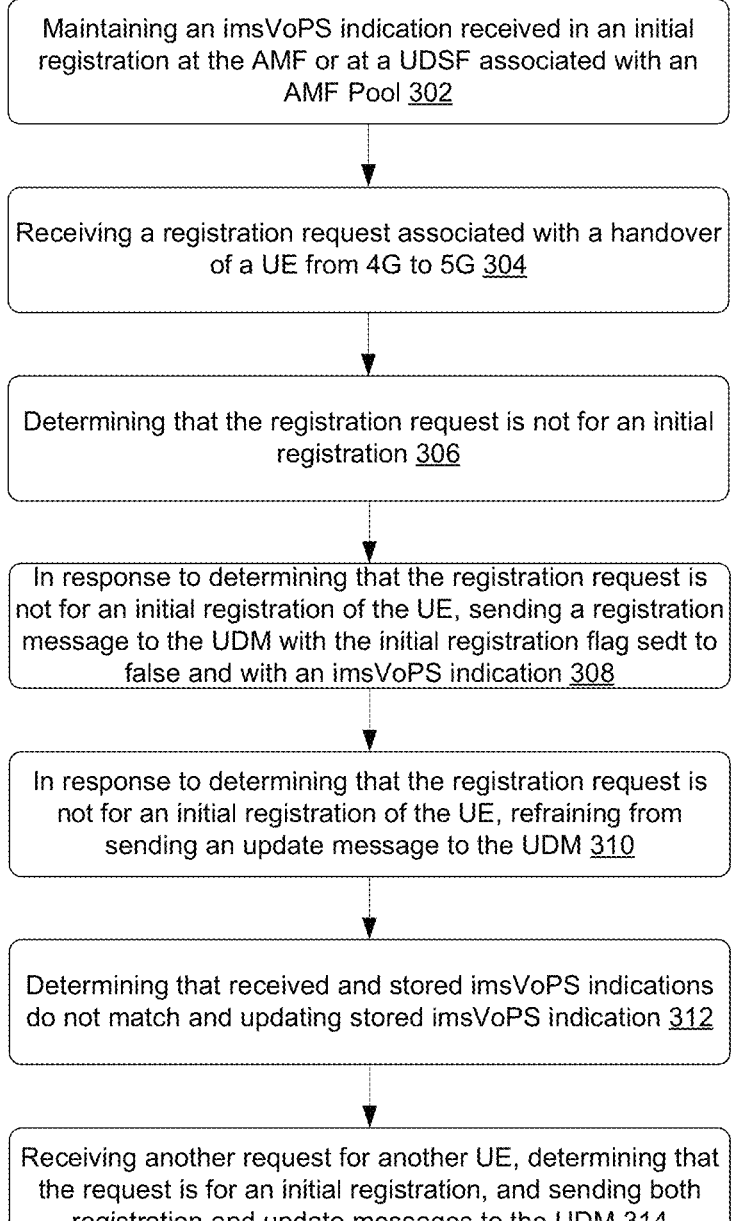

Maintaining an imsVoPS indication received in an initial registration at the AMF or at a UDSF associated with an AMF Pool 302

Receiving a registration request associated with a handover of a UE from 4G to 5G 304

Determining that the registration request is not for an initial registration 306

In response to determining that the registration request is not for an initial registration of the UE, sending a registration message to the UDM with the initial registration flag sedt to false and with an imsVoPS indication 308

In response to determining that the registration request is not for an initial registration of the UE, refraining from sending an update message to the UDM 310

Determining that received and stored imsVoPS indications do not match and updating stored imsVoPS indication 312

Receiving another request for another UE, determining that the request is for an initial registration, and sending both registration and update messages to the UDM 314

FIG.3

AVOIDING REDUNDANT VOICE CAPABILITY UPDATES FROM THE AMF TO THE UDM

BACKGROUND

The increased availability and performance characteristics of fifth generation (5G) networks have greatly enhanced the communication experiences of users. In some environments, however, the relative capabilities of fourth generation (4G) networks and 5G networks may result in handovers from 5G to 4G and, as environment, use, and characteristics vary, handovers back from 4G to 5G. The frequency of handovers has greatly increased signaling among core network nodes, including signaling to the unified data management node (UDM) and the associated unified data repository (UDR). Handovers to 5G may result, for example, in registration messages from an access and mobility management function (AMF) to the UDM, update messages to the UDM, subscribe messages to the UDM, each of these in turn causing a request and response between the UDM and UDR. Handovers away from 5G may result in loss of information obtained by the AMF from these messages, requiring their repetition with each return to 5G.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a flow diagrams of an illustrative process at an AMF for determining that a handover-triggered registration request is not for an initial registration and, in response, providing a registration message with an initial registration flag set to false and refraining from sending an update message.

DETAILED DESCRIPTION

Figure 1:
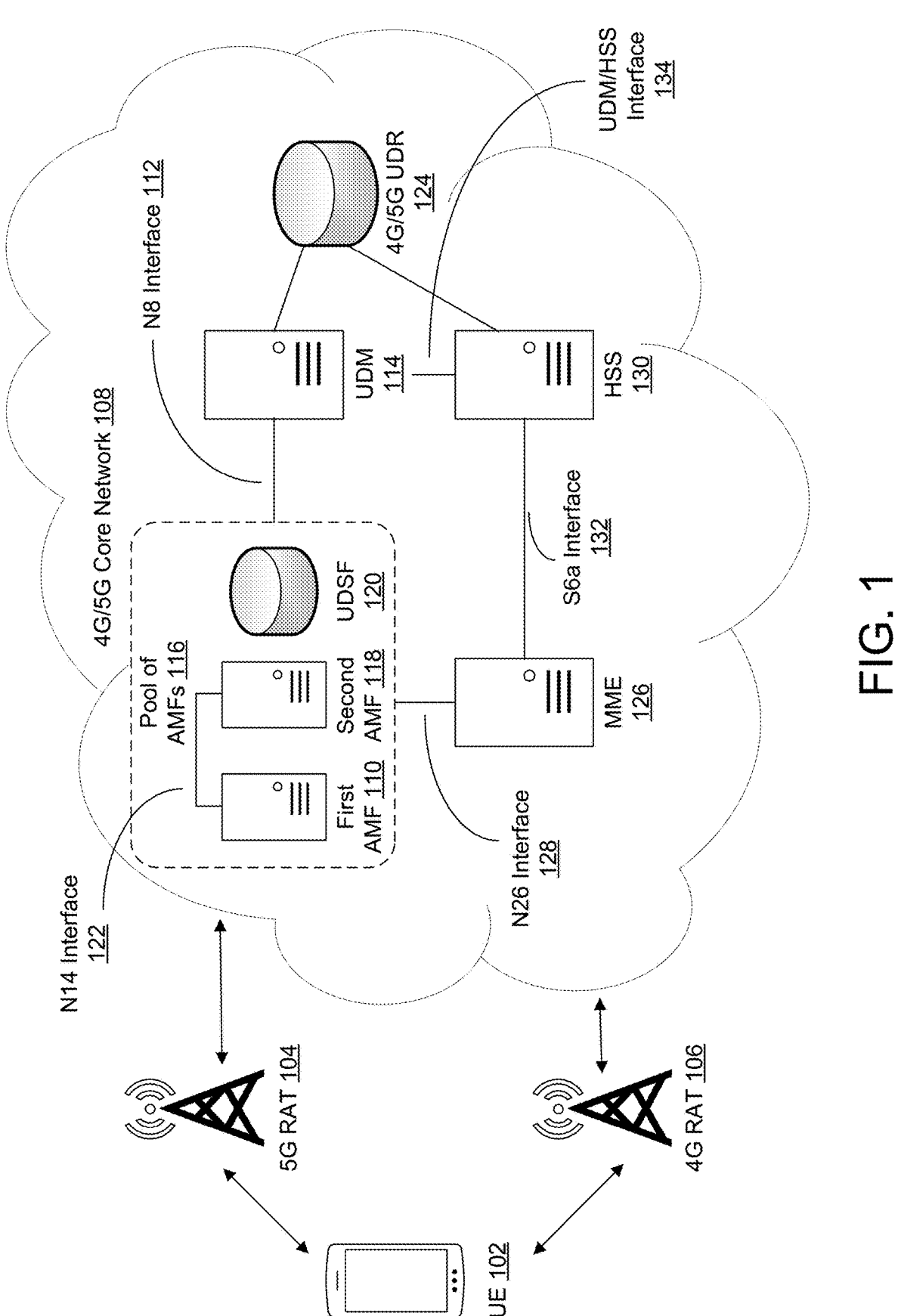
FIG. 1 is a diagram of a telecommunication network having a combined 4G/5G core network ("core network") and 4G and 5G radio access technologies (RATs) available to user equipment (UE) via access networks, the nodes of the core network engaging in signaling and data retention to handle handovers in a manner that optimizes user experience and resource usage.

This disclosure is directed in part to an AMF configured to send a registration message with an initial registration flag set to false to a UDM and refrain from sending an update message to the UDM. The AMF receives a registration request from a UE associated with a handover of the UE from a 4G network to a 5G network and determines that the registration request is not for an initial registration. In response to determining that the registration request is not for an initial registration, the AMF sends the registration message to the UDM with an initial registration flag set to false and refrains from sending the update message to the UDM. The registration request from the UE may include an indication of the voice capabilities associated with the UE, such as an imsVoPS indication, and when the request is not for an initial registration, the imsVoPS indication may be included with the registration message sent from the AMF to UDM. By providing the imsVoPS indication in the registration message, the need for an update message from AMF to UDM to convey the imsVoPS indication is obviated.

In an initial registration, the AMF may store the imsVoPS indication and other UE context information, either in itself or in an unstructured data storage function (UDSF) shared by a pool of AMFs including the AMF that received the initial registration request. In some implementations, the imsVoPS indication may arrive in a subsequent message or request, and the AMF may store the imsVoPS indication at that time. The AMF may also include the imsVoPS indication in the registration message from the AMF to the UDM (e.g., a Nudm_UECM_Registration sent over an N8 interface between the AMF and UDM) conditionally, based on whether it is included in the initial registration request, or may simply forgo including it, leaving that to the update message. The registration message may also set the initial registration flag to true to inform the UDM of the messaging context. Then, because the registration is an initial registration, the AMF may send an update message, such as a Nudm_UECM_Update, over the N8 interface to the UDM. The update message will include the imsVoPS indication.

In subsequent registrations associated with a return from a 4G network to the 5G network, an update message may only be sent if the AMF discovers that the imsVoPS indication has changed. Such a discovery may be made by comparing an imsVoPS indication returned in a response to the registration message from the UDM to the imsVoPS indication received in the registration request. If there is not a match, the AMF may send an update message with the updated imsVoPS to the UDM.

Otherwise, the imsVoPS is provided in the registration message and the AMF refrains from sending an update message. This avoided message also avoids a lightweight directory access protocol (LDAP) read and write between the UDM and a unified data repository (UDR) and a response from the UDM to the AMF, reducing signaling by four messages.

FIG. 1 is a diagram of a telecommunication network having a combined 4G/5G core network ("core network") and 4G and 5G RATs available to UEs via access networks, the nodes of the core network engaging in signaling and data retention to handle handovers in a manner that optimizes user experience and resource usage. As illustrated, a UE 102 may connect to a 5G RAT 104 or a 4G RAT 106 of one or more access networks and may be directed from one to the other through handover operations. The base station(s) implementing the RATs 104 and 106 may in turn be connected to a combined 4G/5G core network 108 ("core network 108"). The core network 108 may include a first AMF 110 connected to a UDM 112 via an N8 interface 114. The first AMF 110 may be part of a pool 116 of AMFs, the pool 116 also including a second AMF 118 and an unstructured data storage function (UDSF) 120. The AMFs 110 and 118 of the pool 116 may also be connected via N14 interfaces 122, enabling handovers among the AMFs 110 and 118 of the pool 116. The UDM 112 may be connected to a UDR 124, the UDR 124 serving as a common storage repository for 5G and 4G elements of the core network 108. The core network 108 may also include a mobility management entity (MME) 126, which may communicate with the AMFs 110 and 118 through an N26 interface 128 to facilitate 4G/5G handovers. The MME 126 may be connected to an HSS 130, the HSS 130 accessing the UDR 124 and managing the data therein in an analogous manner to the UDM 112. The MME 126 and HSS 130 may be connected via a S6a interface 132. Lastly, there may be an interface 134 between the UDM 112 and HSS 130.

The UE 102 may be any sort of UE, such as a cellular phone, a mobile device, an Internet-of-Things device (such as a watch, goggles, or other wearable device), a tablet computer, a personal computer (PC), or any sort of device capable of wireless connectivity to one or more access points and of being moved from location to location. The UE 102 may or may not be capable of packet-based voice communication and may indicate its capability to the network via an imsVoPS indication. The packet-based voice communication capabilities of the UE 102 may be a function of the UE 102 itself or of the access network it is connected to.

In various implementations, the 5G RAT 104 may be implemented by a gNode B (gNB)—a 5G base station. The 4G RAT 106 may be implemented by an eNode B (eNB)—a 4G/Long Term Evolution (LTE) base station. The gNB and eNB may be co-located at a same cell site or at different cell sites and may each, through its respective 5G RAT 104 or 4G RAT 106, offer connectivity to the UE 102 and any other UEs in proximity and capable of connecting to that radio access technology. Based on factors such as the location of the UE 102, the number of UEs utilizing the spectrum of the radio access technology, and the types of services those UEs are using, either of the 5G RAT 104 or the 4G RAT 106 may offer a better user experience at a different point in time, leading to handovers of the UE 102 between the 5G RAT 104 and 4G RAT 106. The rules and thresholds governing the handovers may in some circumstances lead to frequent handovers. These frequent handovers in turn result in an increased signaling burden on the core network 108.

In some implementations, the core network 108 includes nodes and devices from both 4G core networks and 5G core networks. As shown, the core network 108 includes at least AMFs 110 and 118, UDSF 120, UDM 112, UDR 124, MME 126, and HSS 130. The core network 108 may also include serving gateways (SGw), packet data network gateways (PGw), session management functions (SMF), user plane function (UPF), policy control function (PCF), or one or more nodes of an Internet protocol multimedia subsystem (IMS), such as a call session control function (CSCF) and its nodes (proxy CSCF (P-CSCF), interrogating CSCF (I-CSCF), and serving CSCF (S-CSCF)) or a policy and charging rule function (PCRF). The different ones among the 4G core network nodes and 5G core network nodes may support their respective, corresponding one of the 4G RAT 106 and 5G RAT 104 and, to support handovers, may communicate with each other over interfaces (e.g., the N26 interface 128 between the AMFs 110/118 and the MME 126).

In various implementations, the first AMF 110 ("AMF 110") and second AMF 118 ("AMF 118") may belong to a same pool 116 of AMFs, which may be associated with a physical location/region. The AMFs of pool 116, including AMF 110 and AMF 118 may maintain their own storage and shared information (e.g., via the N14 interface 122), may utilize a common UDSF 120 to store shared information for the AMFs, or some combination of these approaches. The N14 interface 122 may also be used for handovers between the AMFs, such as between AMF 110 and AMF 118, in which the AMF receiving the handover may receive information stored by the old AMF, by the UDSF, or both. The AMF 110/118 for a given UE, such as UE 102, may receive connection and session related information for the UE, handle connection and mobility management tasks, and forward information for session management to an SMF.

Figure 2:
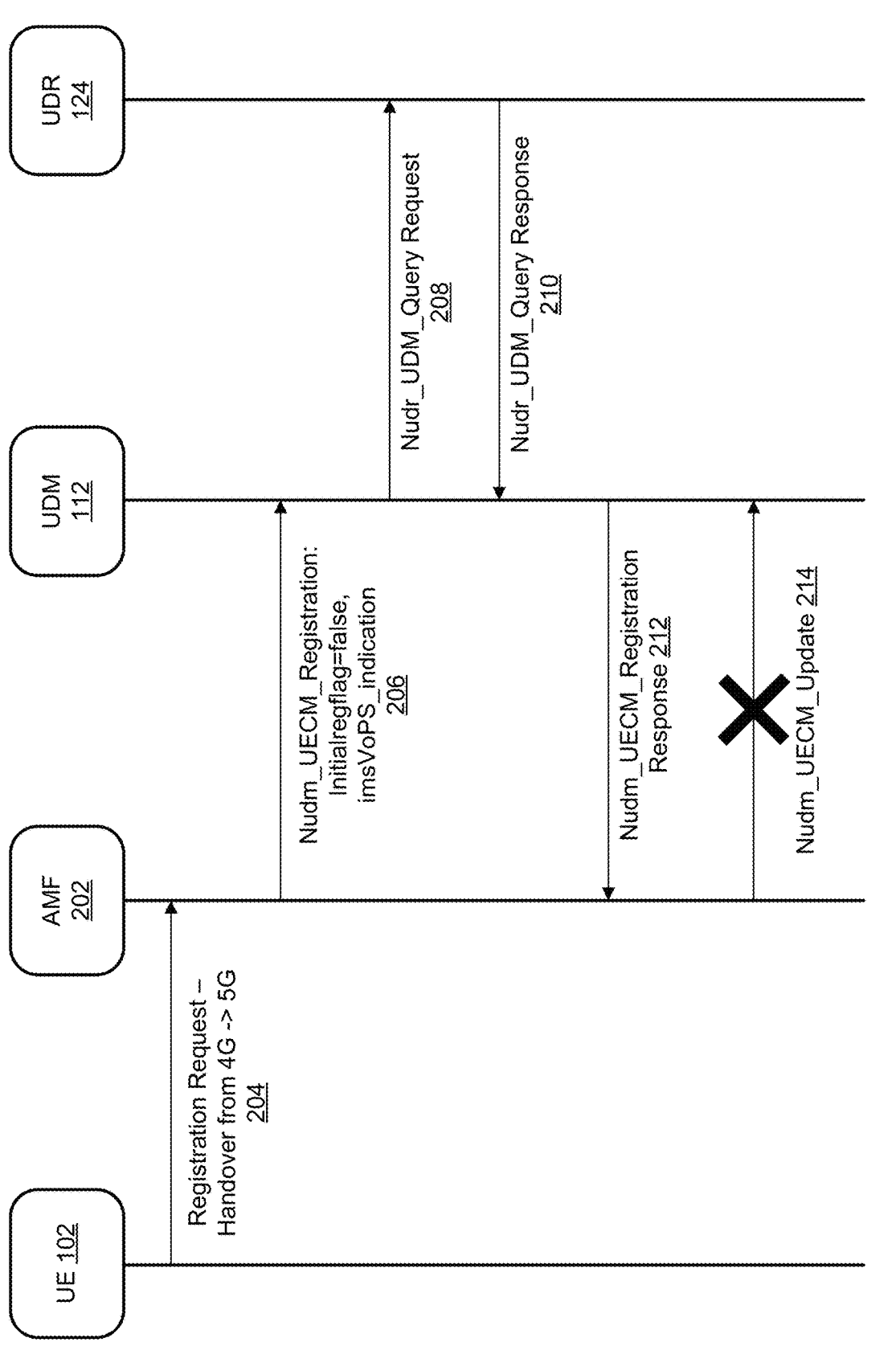
FIG. 2 is a message flow diagram showing a subset of core network nodes and a UE and the messages among these nodes and devices to ensure knowledge of voice capabilities while avoiding unnecessary/redundant signaling.

Additionally, the AMF 110 or 118 sends messages to UDM 112 over the N8 interface 114 (for further discussion of FIG. 1, AMF 110 will be referred to, but with the understanding that what is said of AMF 110 may apply to AMF 118 or any other AMF of the pool 116 of AMFs). Some of these messages over the N8 interface 114 are generated as part of handovers between 4G and 5G of between AMFs, and with frequent handovers, a substantial volume of messages can be generated and impact performance of the AMF 110 and UDM 112. Additional details of such messaging are shown in FIGS. 2 and 3 and described further herein with reference to those figures and in other discussions.

In some implementations, the UDM 112 serves as front-end for user subscription data stored in the UDR 124 to other 5G nodes of the core network 108. The messages through which the UDM 112 requests information and receives it in response from the UDR 124 may conform to a lightweight directory access protocol (LDAP). The UDR 124 serves as the centralized repository of information for the core network 108, storing subscriber profile information, policy data, structured data, application data, etc. In some implementations, in core network 108, the UDR 124 may serve as the centralized repository of information for both 5G nodes (through UDM 112) and 4G nodes (through HSS 130).

In various implementations, the MME 126 provides session management and supports subscriber authentication, roaming, and handovers related to UEs connected to 4G RAT 106. To support handovers from 4G to 5G and from 5G to 4G, the MME 126 may communicate with AMF 110 through an N26 interface 128 between the MME 126 and AMF 110. Also, to provide and receive subscriber information to/from HSS 130, the MME may communicate with the HSS 130 via a S6a interface 132. Information such as authentication, location, and service information may be communicated over the S6a interface 132.

The HSS 130 is the subscriber information database for 4G nodes of core network 108 and either mirrors the UDR 124 or serves as a front end to the UDR 124 for the 4G nodes. In the context of handovers, it may also communicate with the UDM 112 over an interface 134, which may be a proprietary interface or an interface in accordance with standards, such as those of the Third Generation Partnership Project (3GPP).

In order to make a voice call using packet-based services within the core network 108, a UE 102 needs to establish that it is capable of making a voice call using packet-based services. It does so by providing an imsVoPS indication to nodes of the core network 108. The imsVoPS indication may be provided in the context of a handover, such as a handover from 4G to 5G, or in the context of an initial registration. The imsVoPS indication may be provided by the UE 102 in a registration request or in a subsequent message from the UE 102. Because the imsVoPS indication may sometimes be provided in a subsequent message in an initial registration, and because the AMF 110 has received the initial registration and sent a registration message to the UDM 112, the AMF 110 may send the imsVoPS indication to the UDM 112 in an update message. In other contexts, when the imsVoPS indication is received in the registration request from the UE 102, the imsVoPS indication may end up being sent twice from the AMF 110 to the UDM 112—in both the registration message and the update message-unless the update message is suppressed.

FIG. 2 is a message flow diagram showing a subset of core network nodes and a UE and the messages among these nodes and devices to ensure knowledge of voice capabilities while avoiding unnecessary/redundant signaling. As illustrated, a UE 102, AMF 202, UDM 112, and UDR 124 exchange messages. The AMF 202 represents AMF 110, AMF 118, or any AMF of the pool 116 of AMFs. Also, the messages shown in FIG. 2 are in the context of a handover from 4G to 5G where the registration request is not for an initial registration. Also, FIG. 2 reflects a scenario in which there has been no change to the imsVoPS indication. Scenarios where there has been a change to the imsVoPS indication or where the registration request is for an initial registration are discussed following FIG. 2.

As illustrated, AMF 202 receives a registration request 204 from the UE 102. The registration request 204 is associated with a handover from 4G to 5G and includes an imsVoPS indication. Upon receiving the registration request 204, the AMF 202 determines whether the registration request 204 is for an initial registration. The AMF 202 may make this determination, for example, be checking to see if the AMF 202, another AMF in its pool of AMFs, or a UDSF associated with the AMF 202 maintains information from a prior registration, such as the imsVoPS indicator. If such information is maintained, the AMF 202 determines that the registration request 204 is not for an initial registration. In other implementations, other determination techniques may be used—for example, the registration request 204 may include an indication of whether it is associated with an initial registration.

After receiving the registration request 204, the AMF 202 sends a registration message 206, such as a Nudm_UECM_Registration request message, to the UDM 112. Such a message 206 may be send over the N8 interface 114 between the AMF 202 and UDM 112. The registration message 206 may further include a flag (e.g., "initialreg-flag") set to true or false to indicate whether the registration associated with the registration request 204 is an initial registration. Such information may be used by the UDM 112 to set its own tracking information—such as a 5G registration status indication to "active" or "inactive"—and to determine whether to expect further signaling (e.g., an update message). The registration message 206 may also include an imsVoPS indication. Besides sending the imsVoPS indication, the AMF 202 may also store/maintain it for further use.

In various implementations, the UDM 112 may then make a request 208 to the UDR 124 and receive a response from the UDR 124, both in accordance with LDAP. The request 208 may be a Nudr_UDM_Query request 208 and the response may be a Nudr_UDM_Query response 210. Such a request 208 and response 210 may retrieve subscriber profile information, store subscriber profile information (e.g., the imsVoPS indication or 5G registration status, etc.).

The UDM 112 may then send a response 212 to the registration message 206 which may include information received in response 212 for use by the AMF 202 or other nodes of the core network 108.

In further implementations, based on determining that the registration request 204 is not for an initial registration, the AMF 202 refrains from sending an update message 214, such as a Nudm_UECM_Update, to the UDM 112. By refraining from sending the update message 214 to the UDM 112, two messages over the N8 interface 114 are avoided (the update message 214 and the response to it) and two messages between the UDM 112 and UDR 124 are avoided (an LDAP request and response). Because the AMF 202 retains the imsVoPS indication after the initial registration, the AMF 202 is in a position to include the imsVoPS indication with the registration message 206, and the update message 214 is redundant.

In some implementations, though, after sending the registration message 206, the AMF 202 may discover that the imsVoPS indication has changed. In such circumstances, the AMF 202 may send an update message 214 even though the registration is not an initial registration. The AMF 202 will update its own stored imsVoPS indication as well, and the UDM 112 may also do so. The AMF 202 may discover the change to the imsVoPS indication by comparing the imsVoPS indication received in the registration request 204 to the imsVoPS indication it has stored or by receiving an imsVoPS indictor in response 212, reflective of what is stored in the UDR 124, and discover that there is a different between the imsVoPS indications received in the response 212 and registration request 204. Again, an update message 214 may be used to update the UDM 112 and UDR 124. In other implementations, however, the use of the update message 214 may be avoided by detecting, by the AMF 202, the changed imsVoPS indication before sending of the registration message 206 or detecting, by the UDM 112, the changed imsVoPS indication.

In scenarios where the registration request 204 is for an initial registration, the AMF 202 may send an update message 214 as the imsVoPS indication may or may not be received with the registration request 204.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 is a flow diagrams of an illustrative process 300 at an AMF for determining that a handover-triggered registration request is not for an initial registration and, in response, providing a registration message with an initial registration flag set to false and refraining from sending an update message. As illustrated at 302, an AMF may maintain an imsVoPS indication received in the initial registration while the UE associated with that imsVoPS indication is on the 4G network and continue to maintain it when the UE transitions back to the 5G network. The AMF may part of pool of AMFs sharing an initial registration status for the UE, such as imsVoPS indication, among the AMFs of the pool. The status and indication may be stored in the UDSF of the pool of AMFs.

At 304, the AMF receives a registration request from UE associated with a handover of the UE from the 4G network to the 5G network. That registration request may include an imsVoPS indication for UE.

At 306, the AMF determines that the registration request is not for an initial registration of the UE. For example, the AMF may check the status and indication maintained by the AMF or pool or AMFs to see if they include information obtained in a prior registration.

At 308, in response to determining that the registration request is not for an initial registration of the UE, the AMF sends a registration message to the UDM with an initial registration flag set to false. The AMF may also include the imsVoPS indication in the registration message.

At 310, also in response to determining that the registration request is not for an initial registration of the UE, the AMF refrains from sending an update message to the UDM.

At 312, the AMF or UDM may determine that the imsVoPS indication in the registration request from the UE does not match a stored imsVoPS indication (stored, e.g., in the AMF, UDSF, or UDR) and update the stored imsVoPS indication with the imsVoPS indication received from the UE in the registration request.

At 314, the AMF may receive another registration request associated with another handover of another UE, determine that the other registration request is an initial registration, send another registration message with an initial registration flag set to true, and send an update message to the UDM. The other registration message may include the imsVoPS indication for the other UE, and the update message will include the imsVoPS indication for the other UE. The operation shown at 314 may also happen before the operations shown at 302-312 or concurrently with any one or more of those operations.

Figure 4:
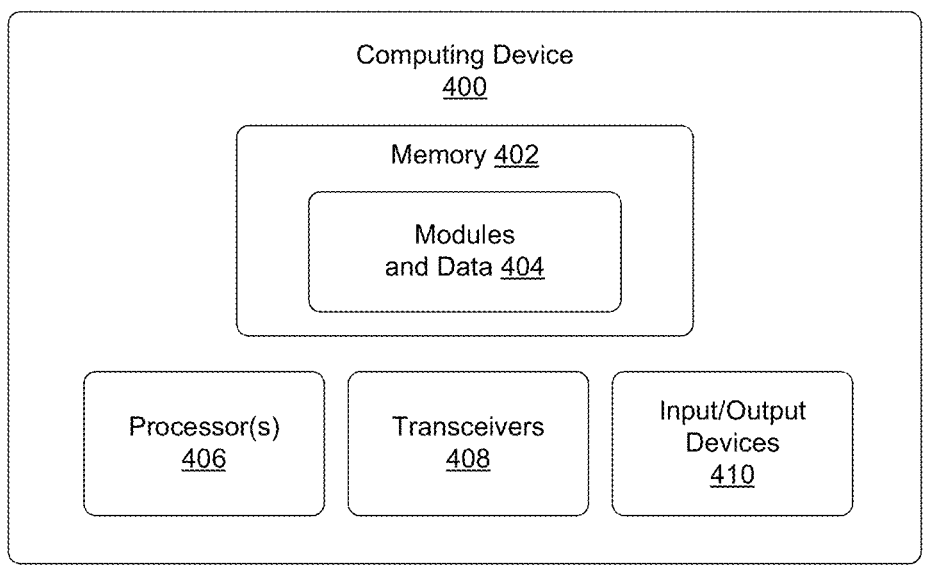
FIG. 4 is a schematic diagram of a computing device capable of implement functionality of one or more nodes of the core network.

FIG. 4 is a schematic diagram of a computing device capable of implement functionality of one or more nodes of the core network. As shown, the computing device 400 includes a memory 402 storing modules and data 404, processor(s) 406, transceivers 408, and input/output devices 410.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 402 can include one or more software or firmware elements, such as computer-readable instructions that are executable by the one or more processors 406. For example, the memory 402 can store computer-executable instructions associated with modules and data 404. The modules and data 404 can include a platform, operating system, and applications, and data utilized by the platform, operating system, and applications. Further, the modules and data 404 can implement any of the functionality for the AMF 110, the AMF 118, the UDM 112, the UDR 124, the UE 102, or any other node/device described and illustrated herein.

In various examples, the processor(s) 406 can be a central processing unit (CPU), a graphics processing unit (GPU), or both CPU and GPU, or any other type of processing unit. Each of the one or more processor(s) 406 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 402, which can be associated with types of volatile (RAM) and/or nonvolatile (ROM) memory.

The transceivers 408 can include modems, interfaces, antennas, Ethernet ports, cable interface components, and/or other components that perform or assist in exchanging wireless communications, wired communications, or both.

While the computing device need not include input/output devices 410, in some implementations it may include one, some, or all of these. For example, the input/output devices 410 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 410 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 410 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, by an access and mobility management function (AMF), a registration request from a user equipment (UE) associated with a handover of the UE from a fourth generation (4G) network to a fifth generation (5G) network;
   determining, by the AMF, that the registration request is not for an initial registration; and
   in response to the determining:
      sending, by the AMF, a registration message to a unified data management node (UDM) with an initial registration flag set to false, and
      refraining, by the AMF, from sending an update message to the UDM.

2. The method of claim 1, further comprising maintaining, by the AMF, an imsVoPS indication received in the initial registration while the UE is on the 4G network.

3. The method of claim 1, wherein the registration request includes an imsVoPS indication.

4. The method of claim 3, wherein sending the registration message further comprises sending the imsVoPS indication to the UDM.

5. The method of claim 4, further comprising determining that the imsVoPS indication does not match a stored imsVoPS indication and updating the stored imsVoPS indication with the imsVoPS indication received from the UE in the registration request.

6. The method of claim 1, further comprising receiving another registration request associated with another handover, determining that the other registration request is an initial registration, sending another registration message with an initial registration flag set to true, and sending an update message to the UDM.

7. The method of claim 1, wherein the AMF is part of pool of AMFs sharing an initial registration status for the UE.

8. A system comprising:

one or more processors; and a plurality of programming instructions that, when executed by the one or more processors, program an access and mobility management function (AMF) to perform operations including:

receiving a registration request from a user equipment (UE) associated with a handover of the UE from a fourth generation (4G) network to a fifth generation (5G) network;

determining that the registration request is not an initial registration; and in response to the determining:

sending a registration message to a unified data management node (UDM) with an initial registration flag set to false, and refraining from sending an update message to the UDM.

9. The system of claim 8, wherein the operations further include maintaining an imsVoPS indication received in the initial registration while the UE is on the 4G network.

10. The system of claim 8, wherein the registration request includes an imsVoPS indication.

11. The system of claim 10, wherein sending the registration message further comprises sending the imsVoPS indication to the UDM.

12. The system of claim 11, wherein the operations further include determining that the imsVoPS indication does not match a stored imsVoPS indication and updating the stored imsVoPS indication with the imsVoPS indication received from the UE in the registration request.

13. The system of claim 8, wherein the operations further include receiving another registration request associated with another handover, determining that the other registration request is an initial registration, sending another registration message with an initial registration flag set to true, and sending an update message to the UDM.

14. The system of claim 8, wherein the AMF is part of pool of AMFs sharing an initial registration status for the UE.

15. A non-transitory computer storage medium having a plurality of programming instructions stored thereon that, when executed by one or more processors, program an access and mobility management function (AMF) to perform operations comprising:

receiving a registration request from a user equipment (UE) associated with a handover of the UE from a fourth generation (4G) network to a fifth generation (5G) network;

determining that the registration request is not an initial registration; and in response to the determining:

sending a registration message to a unified data management node (UDM) with an initial registration flag set to false, and refraining from sending an update message to the UDM.

16. The non-transitory computer storage medium of claim 15, wherein the operations further comprise maintaining an imsVoPS indication received in the initial registration while the UE is on the 4G network.

17. The non-transitory computer storage medium of claim 15, wherein the registration request includes an imsVoPS indication.

18. The non-transitory computer storage medium of claim 17, wherein sending the registration message further comprises sending the imsVoPS indication to the UDM.

19. The non-transitory computer storage medium of claim 18, wherein the operations further comprise determining that the imsVoPS indication does not match a stored imsVoPS indication and updating the stored imsVoPS indication with the imsVoPS indication received from the UE in the registration request.

20. The non-transitory computer storage medium of claim 15, wherein the operations further comprise receiving another registration request associated with another handover, determining that the other registration request is an initial registration, sending another registration message with an initial registration flag set to true, and sending an update message to the UDM.

* * * * *